United States Patent
Nickerson et al.

(10) Patent No.: US 6,582,172 B2
(45) Date of Patent: Jun. 24, 2003

(54) ISOLATED MECHANICAL FASTENING SYSTEM

(75) Inventors: Earl S. Nickerson, Little Compton, RI (US); Wayne C. Tucker, Exeter, RI (US); Francis C. Spicola, Portsmouth, RI (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 09/942,281

(22) Filed: Aug. 29, 2001

(65) Prior Publication Data

US 2003/0044256 A1 Mar. 6, 2003

(51) Int. Cl.[7] ............................................... F16B 43/00
(52) U.S. Cl. ..................... 411/371.1; 411/338; 277/598; 277/639; 403/408.1
(58) Field of Search ................................ 411/338, 339, 411/34, 371.1, 369, 542; 403/408.1; 277/598, 593, 639

(56) References Cited

U.S. PATENT DOCUMENTS

| | | | | |
|---|---|---|---|---|
| 3,286,577 A | * | 11/1966 | Weidner, Jr. .................. 277/640 |
| 4,289,061 A | * | 9/1981 | Emmett ........................ 411/10 |
| 4,659,268 A | * | 4/1987 | Del Mundo et al. ........... 411/34 |
| 4,834,569 A | * | 5/1989 | Foote et al. .................. 403/179 |
| 4,975,008 A | * | 12/1990 | Wagner ....................... 411/337 |
| 5,228,795 A | * | 7/1993 | Gray ............................ 403/30 |
| 5,397,206 A | * | 3/1995 | Sihon .......................... 411/369 |
| 5,645,282 A | * | 7/1997 | Belter ......................... 277/598 |
| 5,646,076 A | * | 7/1997 | Bortz ..................... 188/251 A |

* cited by examiner

Primary Examiner—Flemming Saether
Assistant Examiner—Jori Schiffman
(74) Attorney, Agent, or Firm—James M. Kasischke; Michael F. Oglo; Jean-Paul A. Nasser

(57) ABSTRACT

An isolated mechanical fastening system, which includes an exterior first section having a first transverse bore. The system also includes an exterior second section having a second transverse bore, wherein the second transverse bore is aligned with the first transverse bore. There is also an interior third section having a third transverse aperture. This third section is interposed between the first section and the second section and the third transverse bore is aligned with the first and second transverse bores. A fastener is positioned in the first, second and third transverse bore and is fixed to the first section. A polymeric material is positioned in the third section between the fastener and the peripheral wall of the third section.

6 Claims, 1 Drawing Sheet

ISOLATED MECHANICAL FASTENING SYSTEM

STATEMENT OF GOVERNMENT INTEREST

The invention described herein may be manufactured and used by or for the Government of the United States of America for governmental purposes without the payment of any royalties thereon or therefor.

CROSS-REFERENCE TO RELATED PATENT APPLICATIONS

Not applicable.

BACKGROUND OF THE INVENTION (1) Field of the Invention

The present invention relates to mechanical fastening systems and more particularly to such systems including a metal core and a resinous exterior.

(2) Brief Description of the Prior Art

Carbon to metal joints have generally been considered to be galvanically incompatible. Because carbon is an efficient cathode, it has heretofore been necessary to completely isolate carbon from metals in a marine environment. Use of adhesives only reduces reliability. Composite materials such as carbon fiber reinforced plastics (CFRP) and fiberglass reinforced plastics (FRP) are susceptible to failure from bearing stress on mechanical fasteners.

The prior art discloses a number of ways of attaching reinforced polymer components to metal components of a structure.

U.S. Pat. No. 4,033,243 to Kirrish et al., for example, discloses a novel fastener assembly for use in attaching a composite panel section or the like to a frame section. The fastener assembly comprises a first member for engagement in a bore formed in said frame section, said member including an enlarged, tamper-proof head engaging the exterior surface of said frame section and means for preventing rotation relative to said frame sections; and a second member being disposed in a coaxial bore formed in said panel, and having an enlarged head for engagement with said panel, said head including a drive tool engaging means. In addition, the aforementioned first member engaged with said frame section, includes a seal means for attaining a watertight joint when said respective head portions are brought into clamped engagement with said frame and panel sections.

U.S. Pat. No. 4,310,273 to Kirrish discloses a novel fastener assembly for use in securing a frame section to a composite panel or the like, said fastener assembly being dielectrically insulated from said frame section to prevent galvanic action. The fastener assembly is comprised of a bolt member adapted for engagement in a bore formed in said frame section, said bolt member having an enlarged head portion including annular axially facing groove means, and an annular axially extending non-conductive elastomeric gasket member disposed in said groove means, and a nut member having an enlarged head portion for engagement with said bolt member. The nut member is disposed in a coaxial bore formed in said composite panel and engaged with said bolt member also disposed in said bore. Upon assembly, the gasket member is clamped between the frame and the enlarged head on the bolt and is deformed axially and radially. That is, the gasket is extruded into the space between the bolt member and the frame to insulate said bolt member from said frame section. In addition, the aforementioned gasket member provides a watertight joint when said bolt and nut members are brought into clamping engagement with said frame and panel sections.

U.S. Pat. No. 4,902,180 to Gauron discloses a fastener element that is ejection molded from an engineering resin of a type that will bond to potting resin used for securing the fastener element within a cavity formed within a panel of composite material. The fastener element includes flow control disks spaced apart along a stem portion between end portions. Flats are formed on opposite sides of the flow control disks. Below fill and vent openings. Resin introduced into the fill hole travels down to the bottom of the cavity and around the fastener element and fills the cavity from the bottom up, so that the presence of resin at the vent opening will indicate that the cavity has been filled with resin and does not include an airspace or void.

U.S. Pat. No. 5,169,180 to Villoni et al. discloses a fluid conducting connector for use in water connections particularly water heater connectors. The connector assembly is designed for mating connection to a galvanized nipple for reduction of galvanic corrosion between dissimilar metal connections. An insulator sleeve is seated within the connector to maintain separation between the galvanized nipple and the copper tube of the assembly. The connector assembly includes an internally threaded female connector mounted to the copper tube for connection to the nipple. The insulator sleeve includes a tubular body and a radial flange. The body of the sleeve extends partially into the copper tube while the flange seats within the female connector acting as a washer for the assembly.

U.S. Pat. No. 5,175,665 to Pegg discloses a lightning resistant composite structure, particularly for aircraft, in which a composite skin panel, for example of carbon fiber, is attached to an inner composite structure by one or more lightening resistant fastener assemblies. The fastener assembly is comprised of a nut and bolt, the bolt being in good conductive contact with a conductive sleeve engaging the skin panel and a nonconductive sleeve engaging the inner structure. The nut is contained within a capped nut assembly located to the undersurface of the inner structure. The nonconductive sleeve and the capped nut assembly isolate the inner structure from the effects of lightening strike, the conductive sleeve providing a high quality conductive interface between the bolt and the skin panel. By this means, adverse penetration of lightening current into the inner structure is prevented.

U.S. Pat. No. 5,807,051 to Heminger discloses an adhesive insert anchor including an anchor body and a screw member for insertion into a drilled hole in a substrate containing an adhesive. The anchor body further includes an integral friction segment and an adhesion segment. The friction segment includes an internally threaded cavity in which to receive the screw member and a knurled portion. The adhesion segment includes a cylindrical section and a plurality of saucer-shaped buttons positioned along its length ending with a terminal button. The buttons on the adhesion segment provide greater surface area for contact between the adhesive and the anchor. The friction segment has an external diameter substantially the same as the diameter of the hole drilled in the substrate, thereby providing a friction fit between the anchor body and the walls of the substrate hole. The external diameter of the adhesion segment is smaller than the external diameter of the friction segment so that when the anchor body is inserted into the hole in the substrate, there is space between the adhesion segment and the walls of the hole which is completely filled by adhesive so as to securely bond the anchor body with the substrate. The friction fit of the friction segment maintains the adhesion segment of the anchor body a proper distance from the bottom of the substrate hole and provides for light-duty loading of the anchor while the adhesive cures. Upon installation, the adhesion segment is twisted into the hole, thereby agitating the adhesive, which disrupts the substrate dust remaining on the walls of the hole. This allows proper adhesion between the adhesive and the concrete. With the addition of a sleeve, the anchor can be used in overhead applications. An alternate embodiment includes the addition of an insulator fitted to the anchor body to form the friction segment. The insulator being electrically non-conductive and the adhesive being electrically conductive to form a dielectric adhesive insert anchor.

A need still exists, however for am improved way to attach a reinforced polymer element to metal elements of a structure.

SUMMARY OF THE INVENTION

It is an object of the present invention to provide an improved mechanical fastening system for attaching reinforced polymer elements to other elements of a structure and a method for its installation.

It is a further object of the present invention to mechanically fasten galvanically incompatible materials without providing an electrical path or contact area and reduce bearing loads especially in carbon fiber reinforced plastics (CFRP) to metals.

These and other objects are met by the present invention, which is a galvanically isolated mechanical fastening system that comprises
an exterior first section having a first transverse bore. The system also includes an exterior second section having a second transverse bore, wherein said second transverse bore is aligned with said first transverse bore. There is also an interior third section having a third transverse aperture. This third section is interposed between said first section and said second section and said third transverse bore is aligned with said first and second transverse bores. A fastener is positioned in the first, second and third transverse bore and is fixed to the first section. A polymeric material is positioned in the third section between the fastener and the peripheral wall of the third section.

BRIEF DESCRIPTION OF THE DRAWINGS

Other objects, features and advantages of the present invention will become apparent upon reference to the following description of the preferred embodiments and to the drawings, wherein corresponding reference characters indicate corresponding parts in the drawings and wherein.

DESCRIPTION OF THE PREFERRED EMBODIMENT

Figure 1:
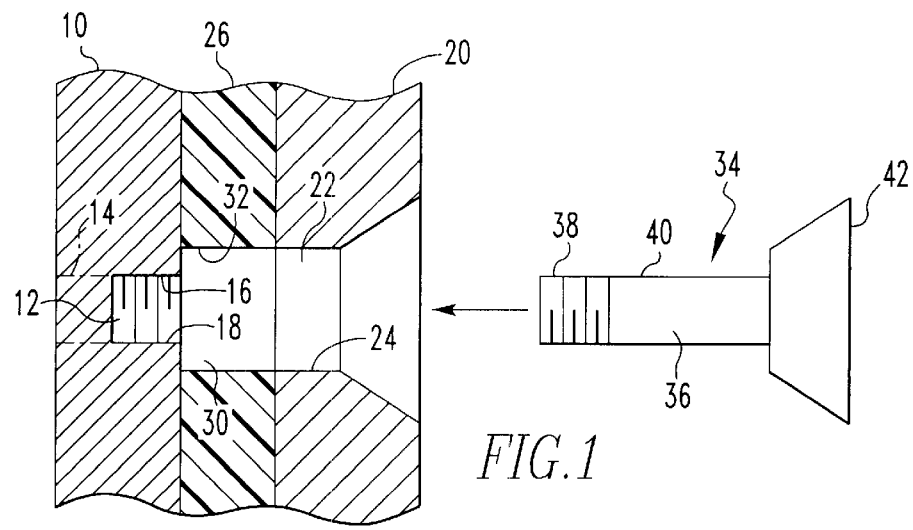
FIG. 1 is a vertical cross sectional view of a preferred embodiment of a mechanical fastening system of the present invention before assembly.
Figure 2:
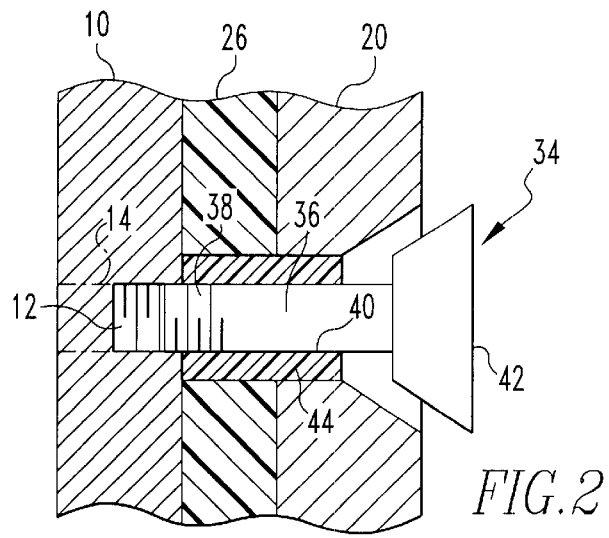
FIG. 2 is a vertical cross section of the isolated mechanical system shown in FIG. 1 during assembly.
Figure 3:
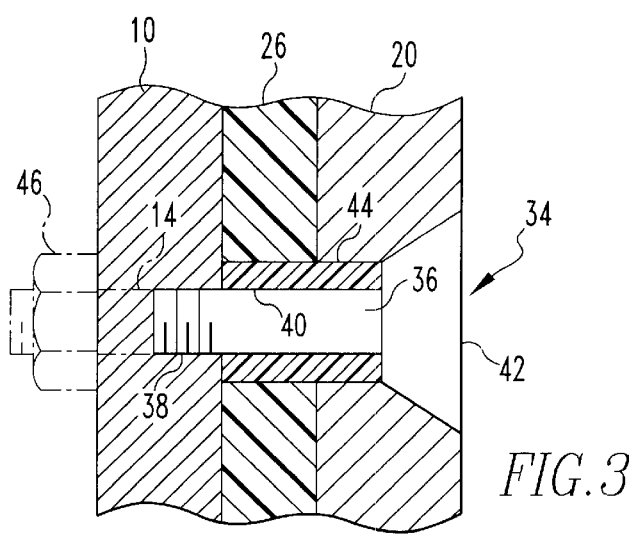
FIG. 3 is a vertical cross sectional view of the isolated mechanical fastening system shown in FIG. 1 after assembly.

Referring to FIGS. 1–3, the exterior first section 10 is a metal plate and has a first transverse bore 12. First transverse bore 12 may be a blind hole or alternatively may be through hole as shown in phantom lines at through hole 14. First transverse bore 12 will also have an inner peripheral surface 16 with a helical screw thread 18. Positioned in exterior opposed relation helical screw thread 18. Positioned in exterior opposed relation to exterior first section 10 there is an exterior second section 20, which is also metal plate. Exterior second section 20 has a second transverse bore 22 with an inner peripheral surface 24. Interposed between exterior first section 10 and exterior second section 20 there is a plate shaped third section 26, which is preferably a reinforced plastic (CFRP) or a fiberglass reinforced plastic (FRP). Alternatively, the third section 26 may also be metal. There is third transverse bore 30 in third interior third section 26. Third transverse bore 30 has an inner peripheral surface 32. A fastener such as bolt 34 is used to connect exterior second section 20 with interior third section 26 and exterior first section 10. Bolt 34 has a shaft 36 with a helical screw thread 38 at its terminal end. There is smooth section 40 of shaft 36 at its terminal end. There is smooth section 40 of shaft 36 between helical screw thread 38 and head 42 of bolt 34. Between smooth section 40 of shaft 36 of bolt 34 and inner peripheral surface 32 adjacent third transverse bore 30 there is annular polymer section 44. In an embodiment in which through hole 14 is used in the first section, a nut 46 (shown in phantom lines) is used to fix an elongated fastener (not shown) to first section 10. For the purpose of this disclosure, the fastener is considered to be fixed to first section 10 whether it engages a screw thread in a blind hole or engages a nut mounted on the side of first section 10.

Referring to FIG. 1, bolt 34 is initially aligned with second transverse bore 22 of exterior second section 20 and third transverse bore 30 of interior third section 28 and first transverse bore 12 of exterior first section 10. Referring to FIG. 2, bolt 34 is then inserted into these aligned bores 22, 30 and 12 until helical screw thread 38 of shaft 36 engages helical screw thread 18 in inner peripheral surface 16 adjacent first transverse bore 10. At this point a two-part polyurethane polymer isolator is injected between shaft 36 of bolt 34 and inner peripheral surface 32 adjacent transverse bore 30 of third section 26. The modules of elasticity of the polyurethane is preferably between 10,000 psi and 100,000 psi and more preferably is 200,000 psi. The polyurethane isolates galvanic contact and softens the bearing loads. The fastener is specially machined to accept the injected polyurethane. Before the two-part polymer section is allowed to completely harden, the helical screw thread 38 of shaft 36 of bolt 24 is advanced on helical screw thread 18 on inner peripheral surface 16 adjacent first transverse bore 12 on exterior first section 10 as shown in FIG. 3 Such advancement proceeds until bolt 34 is fully seated in first transverse bore 12 on exterior first section 10. At this point head 42 of bolt 34 will be seated in second transverse bore 22 in exterior second section 20. Smooth section 40 of shaft 36 of bolt 34 will be positioned in third transverse bore 30 and annular polymer section 44 will be allowed to harden between smooth section 40 of shaft 36 and inner peripheral surface 32 adjacent transverse bore 30 of third section 26. A bond will be formed between annular polymer section 44 and inner peripheral wall 32 of third section 26.

In an alternate embodiment, adhesive can be used between the sections in the above-described section. Those skilled in the art will appreciate that particular adhesives will provide best results when particular materials are used for the plates. With proper installation it is found that carbon fiber reinforced plastics (CFRP) to metal joints are possible, particularly when the metal is titanium or stainless steel.

It will be appreciated that a reliable, efficient and cost effective mechanical fastening system for attaching a reinforced polymer composite material element to other element of a structure and a method for installation has been described.

It will also be appreciated that the present invention provides a way to mechanically fasten galvanically incompatible materials without providing an electrically conductive path and will reduce bearing loads especially in carbon fiber reinforced plastics (CFRP) to metals.

While the present invention has been described in connection with the preferred embodiments of the various figures, it is to be understood that other similar embodiments may be used or modifications and additions may be made to the described embodiment for performing the same function of the present invention without deviating therefrom. Therefore, the present invention should not be limited to any single embodiment, but rather construed in breadth and scope in accordance with the recitation of the appended claims.

What is claimed is:

1. An isolated mechanical fastening system comprising:
   an exterior first section having a first transverse bore with a first inner peripheral wall surface;
   an exterior second section having a second transverse bore, wherein said second transverse bore is aligned with said first transverse bore and has a second inner peripheral surface;
   an interior third section having a third transverse bore, wherein said third section is interposed between said first section and said second section and said third transverse bore is aligned with said first and second transverse bores and has a third inner peripheral surface, wherein said first second and third sections are each plates and wherein said first and second sections are each metal, and wherein the third section is reinforced polymer composite material which is reinforced with a carbonaceous material;
   a fastening means positioned in the first, second, and third transverse bores and means for fixing said fastening means to the first section; and
   an annular polymeric section positioned between and contacting both the fastening means and the third inner peripheral surface, said annular polymeric section completely filling a space between said fastening means and said third inner peripheral surface.

2. An isolated mechanical fastening system comprising:
   an exterior first section having a first transverse bore with a first inner peripheral wall surface;
   an exterior second section having a second transverse bore, wherein said second transverse bore is aligned with said first transverse bore and has a second inner peripheral surface;
   an interior third section having a third transverse bore, wherein said third section is interposed between said first section and said second section and said third transverse bore is aligned with said first and second transverse bores and has a third inner peripheral surface;
   a fastening means positioned in the first, second, and third transverse bores and means for fixing said fastening means to the first section; and
   an annular polymeric section positioned between and contacting both the fastening means and the third inner peripheral surface, said annular polymeric section completely filling a space between said fastening means and said third inner peripheral surface, and wherein the annular polymeric section is formed from a polyurethane having a modulus of elasticity of from about 10,000 psi to about 100,000 psi.

3. An isolated mechanical fastening system comprising:
   an exterior first section comprised of metal selected from the group consisting of titanium and stainless steel and having a first transverse bore with a first inner peripheral surface;
   an exterior second section comprised of metal selected from the group consisting of titanium and stainless steel and having a second transverse bore, wherein said second transverse bore is aligned with said forst transverse bore and has a second inner peripheral surface;
   an interior third section comprised of reinforced polymer composite material which is reinforced with a carbonaceous material having a third transverse bore, wherein said third section is interposed between said first section and said second section and said third transverse bore is aligned with said first and second transverse bore and has a third inner peripheral surface;
   a fastening means positioned in the first, second and third transverse bores and means for fixing said fastening means to the first section; and
   an annular polymeric section comprised of a polyurethane having a modulus of elasticity between about 10,000 psi and about 100,000 psi and positioned between the fastening means and the third inner peripheral surface.

4. A process for installing an isolated mechanical fastening system comprising the steps of:
   providing an exterior first section having a first transverse bore with a first inner peripheral surface;
   providing an exterior second section having a second transverse bore, wherein said second transverse bore is aligned with said first transverse bore and has a second inner peripheral surface;
   providing an interior third section having a third transverse bore, wherein said third section is interposed between said first section and second section and said third transverse bore is aligned with said first and second transverse bores and has a third inner peripheral surface, wherein said first second, and third section are each plates, and wherein the first and second sections are each metal, and wherein the third section is a reinforced polymer composite material reinforced with a carbonaceous material;
   providing a fastening positioned in the first, second, and third transverse bores and fixing said fastening means to the first section; and
   injecting a polymeric material between the fastening means and the third inner peripheral surface of the third section so that said polymeric material completely fills a space between said fastening means and said third inner peripheral surface.

5. A process for installing an isolated mechanical fastening system comprising the steps of:
   providing an exterior first section having a first transverse bore with a first inner peripheral surface;
   providing an exterior second section having a second transverse bore, wherein said second transverse bore is aligned with said first transverse bore and has a second inner peripheral surface;
   providing an interior third section having a third transverse bore, wherein said third section is interposed between said first section and said second section and said third transverse bore is aligned with said first and second transverse bores and has a third inner peripheral surface;

providing a fastening positioned in the first, second, and third transverse bore and fixing said fastening means to the first section; and injecting a polymeric material between the fastening means and the third inner peripheral surface of the third section so that said polymeric material completely fills a space between and fastening means and said third inner peripheral surface, and wherein the polymeric material is a polyurethane having a modulus of elasticity of from about 10,000 psi to about 100,000 psi.

6. A process for installing an isolated mechanical fastening system comprising the steps of:

providing an exterior first section having a first transverse bore with a first inner peripheral surface;

providing an exterior second section having a second transverse bore, wherein said second transverse bore is aligned with said first transverse bore and has a second inner peripheral surface;

providing an interior third section having a third transverse bore, wherein said third section is interposed between said first section and said second section and said third transverse bore is aligned with said first and second transverse bores and has a third inner peripheral surface;

providing a fastening means positioned in the first, second, and third transverse bores and fixing said fastening means to the first section; and injecting a polymeric material between the fastening means and the third inner peripheral surface after the fastening means initially enters the first bore, but before the fastening means is fully seated in the first bore.

* * * * *